United States Patent
Dal Pozzo et al.

(10) Patent No.: US 9,327,794 B2
(45) Date of Patent: May 3, 2016

(54) CONTROL LEVER AND ACTUATION DEVICE OF A BICYCLE GEARSHIFT OF THE BAR-END TYPE

(75) Inventors: Massimo Dal Pozzo, Rotzo (IT); Giuseppe Dal Pra', Zane (IT)

(73) Assignee: Compagnolo S.r.l., Vicenza (IT)

( * ) Notice: Subject to any disclaimer, the term of this patent is extended or adjusted under 35 U.S.C. 154(b) by 291 days.

(21) Appl. No.: 13/310,383

(22) Filed: Dec. 2, 2011

(65) Prior Publication Data
US 2012/0167706 A1    Jul. 5, 2012

(30) Foreign Application Priority Data
Dec. 3, 2010    (EP) .................................... 10015256

(51) Int. Cl.
G05G 1/06 (2006.01)
B62K 23/06 (2006.01)
B62M 25/04 (2006.01)

(52) U.S. Cl.
CPC ................ *B62K 23/06* (2013.01); *B62M 25/04* (2013.01); *Y10T 74/20037* (2015.01)

(58) Field of Classification Search
CPC ............................... B62K 23/06; B62M 25/04
USPC .............. 74/473.13, 473.33, 489, 491, 502.2, 74/504, 519, 523, 524, 551.1, 551.9
IPC ........... G05G 11/00; B62M 25/04; B62K 23/06
See application file for complete search history.

(56) References Cited

U.S. PATENT DOCUMENTS

| 4,586,396 | A | 5/1986 | Nagano | |
|---|---|---|---|---|
| 4,613,319 | A | 9/1986 | Nagano | |
| 4,951,525 | A * | 8/1990 | Borromeo | 74/551.1 |
| 5,000,469 | A * | 3/1991 | Smith | 280/261 |
| 5,979,015 | A * | 11/1999 | Tamaribuchi | 16/110.1 |
| 7,565,848 | B2 * | 7/2009 | Fujii | 74/473.12 |
| 7,698,967 | B2 * | 4/2010 | Ording et al. | 74/551.8 |
| 7,837,212 | B2 * | 11/2010 | D'Aluisio | 280/281.1 |
| 8,297,143 | B2 * | 10/2012 | Fujii et al. | 74/473.13 |
| 8,393,246 | B2 * | 3/2013 | Poertner et al. | 74/551.8 |
| 2006/0053940 | A1 | 3/2006 | McLaughlin et al. | |
| 2007/0261508 | A1 * | 11/2007 | Acenbrak | 74/502.2 |
| 2008/0168857 | A1 * | 7/2008 | Chiang | 74/551.1 |

(Continued)

FOREIGN PATENT DOCUMENTS

| CN | 1883999 A | 12/2006 |
|---|---|---|
| CN | 101891005 A | 11/2010 |

(Continued)

OTHER PUBLICATIONS

European Search Report, Appln. No. EP 10015256.0-1254, dated Jul. 19, 2011.

(Continued)

*Primary Examiner* — Adam D Rogers (74) *Attorney, Agent, or Firm* — Volpe and Koenig, P.C.

(57) ABSTRACT

The control lever (120) comprises a substantially cylindrical body (130) for mounting in the actuation device (100) and an arm (140), which projects with respect to the body (130) according to a main axis (A) substantially tangential to the upper part of the body (130) and is intended to face forwards in the direction of travel of the bicycle. The arm (140) comprises a first upper pressure area (141), concave and adjacent to the body (130), and a second lower pressure area (142), remote from the body (130).

26 Claims, 5 Drawing Sheets

(56) References Cited

U.S. PATENT DOCUMENTS

| | | | |
|---|---|---|---|
| 2008/0276748 A1* | 11/2008 | Chen | 74/502.2 |
| 2010/0000368 A1 | 1/2010 | Poertner et al. | |
| 2010/0294068 A1 | 11/2010 | Fujii et al. | |
| 2012/0137819 A1* | 6/2012 | Dal Pozzo et al. | 74/502.2 |
| 2012/0200061 A1* | 8/2012 | D'Aluisio | 280/281.1 |
| 2013/0220062 A1* | 8/2013 | Valle et al. | 74/523 |
| 2015/0145230 A1* | 5/2015 | Poole | 280/210 |

FOREIGN PATENT DOCUMENTS

| | | |
|---|---|---|
| DE | 4418717 A1 | 12/1995 |
| EP | 1736404 A1 | 12/2006 |
| EP | 1837275 A2 | 9/2007 |
| EP | 2253531 A1 | 11/2010 |
| GB | 645375 | 11/1950 |
| JP | 60013885 U1 | 1/1985 |
| JP | 60030892 | 3/1985 |
| JP | 09000356 U | 6/1997 |
| WO | 2006050153 A2 | 5/2006 |

OTHER PUBLICATIONS

Chinese Office Action issued on Aug. 28, 2014 in the corresponding Chinese Application No. 201110398955.3.
Japanese Office Action issued on Jun. 9, 2015 in JP Application 2011-264424.

* cited by examiner

CONTROL LEVER AND ACTUATION DEVICE OF A BICYCLE GEARSHIFT OF THE BAR-END TYPE

BACKGROUND

The present invention refers to a control lever for an actuation device of a bicycle gearshift of the bar-end type, to an actuation device comprising such a control lever and to a pair of such devices for the two ends of handlebars.

It is well-known that in bicycles intended for competition there is a constant search for solutions to improve performance. In particular, for bicycles intended for speed races, such as typically time trials, it is particularly important to have good aerodynamic configuration of all of the components of the bicycle. Moreover, a factor in improving performance is considered to be the efficiency of all of the controls but also the ease and safety with which they are actuated, so that the cyclist is able to concentrate on the physical effort without hindrances due to difficulties in actuating the controls.

Recently, it has become common to use specialised handlebars specifically for speed races, which have their two ends facing significantly forwards; this allows the cyclist to maintain his/her bust in a forward leaning position that is aerodynamically efficient.

With these handlebars, specific actuation devices have also become common, both for the brakes and for the gearshifts; these devices are commonly known as bar-end since they are housed right at the ends of the handlebars, so that the cyclist can easily actuate them.

The Applicant has realised that it is possible to improve the overall efficiency of a device of this type, in particular of an actuation device of the gearshift, by making it such that the cyclist takes up the aerodynamically best hand position and can actuate the device without a substantial change in position.

DESCRIPTION OF THE PREFERRED EMBODIMENTS

Introduction

In general, the actuation device includes a control lever that is made part of the device which is mounted at respective end of the handlebars. The control lever has a body with a main axis and an arm which projects from the body according to a main axis and is substantially tangential to the upper part of the body. The arm is further configured to provide at least a first upper pressure area that is concave and adjacent to the body and a second lower pressure area that is remote from the body.

The cyclist, while gripping the handlebars at the end, during pedalling, can engage the first pressure area with the thumb, bent to grip the control lever in a position very close to the end of the handlebars, where the hand sits, with the index finger bent under the control lever. As a result there is an aerodynamically favourable position, because the thumb is in part housed within the control lever due to the concavity of the first pressure area. Moreover, the cyclist can carry out upward and downward gearshifting without substantially having to change his hand position; this makes it easier to both carry out gearshifting quickly and to maintain aerodynamically favourable conditions.

Preferably, there is a third lower pressure area, which is concave, between the body and the second pressure area. This third pressure area makes it possible to have an alternative position for the index finger, bent under the control lever instead of straight. This position is also aerodynamically favourable, because the index finger stays partially housed within the concave pressure area, and also in this position the cyclist can have complete control of the actuation device to carry out gearshifting.

Even more preferably, there is a fourth upper pressure area, remote from the body. This fourth pressure area makes it possible to have an alternative position for the thumb, stretched out on top of the control lever instead of bent. This position is also aerodynamically favourable, because the thumb is stretched out forwards, and also in this position the cyclist can have complete control of the actuation device to carry out gearshifting.

The fourth pressure area can be flat or else preferably slightly concave, so as to match the typical anatomy of the thumb, in which the third phalange (the outer one) projects slightly further (towards the other fingers) than the second phalange, so as to promote aerodynamics.

Preferably, the second pressure area is substantially flat or possibly slightly concave, so as to match the typical anatomy of the index finger, in which the phalanges do not have marked projections, so as to promote good aerodynamics.

More preferably, the second pressure area is arranged a greater distance from the main axis than the other pressure areas. With this configuration the stroke that the index finger must make to command gearshifting is reduced, thus facilitating the manoeuvre.

Preferably, the depth of the concavity of the first pressure area is greater on one side than on the other, with respect to the main axis of the arm. Indeed, it may be suitable to leave a greater depth on the inner side, with respect to the direction of travel, due to the inclination that the thumb can take up when resting on the control lever.

Preferably, the depth of the concavity of the third pressure area is greater on one side than on the other, with respect to the main axis of the arm. Indeed, it may be suitable to leave a greater depth on the inner side, with respect to the direction of travel, due to the inclination that the index finger can take up when resting on the control lever.

Preferably, the shape in plan of the arm is tapered going away from the body. Preferably, the arm has an end remote from the inclined body, both with respect to the main axis of the arm, and with respect to a direction perpendicular to the main axis. Both of these shape characteristics give the control lever better aerodynamics.

In its second aspect, the invention more specifically concerns an actuation device of a bicycle gearshift of the bar-end type, comprising a casing adapted to be mounted at the end of handlebars facing forwards in the direction of travel of the bicycle and a control lever with the characteristics illustrated above, supported so as to be able to rotate with respect to the casing according to the axis of the cylindrical body of the control lever.

Preferably, the body of the control lever is mounted asymmetrically on the casing, laterally displaced with respect to the main axis of the arm. This lateral displacement ensures that the index finger of the hand that grips the control lever together with the control lever itself forms a unit substantially aligned with the end of the forward-facing handlebars, with an overall aerodynamic advantage.

Preferably, in a pair of actuation devices with the characteristics illustrated above, in one of the devices the body of the control lever is mounted asymmetrically displaced on one side, whereas in the other of the devices it is mounted asymmetrically displaced on the other side. More preferably, in the device intended for the right end of the handlebars the body of the control lever is mounted on the casing asymmetrically displaced to the left, whereas in the device intended for the left end of the handlebars the body of the control lever is mounted on the casing asymmetrically displaced to the right.

Further characteristics and advantages of the invention will become clearer from the following description of a preferred embodiment thereof, made with reference to the attached drawings. In such drawings.

DETAILED DESCRIPTION OF PREFERRED EMBODIMENTS

The figures show an actuation device 100 of the control cable of a gearshift of a racing bicycle (not shown), in particular for speed races. The device 100 is a so-called bar-end device, mounted on the left end MS of bicycle handlebars of the type used on racing bicycles, and even more specifically bicycles specialised for time trials; in such handlebars, the left end MS (as well as the right end MD) faces forwards, with respect to the direction of forward motion of the bicycle, according to a main axis A.

The device 100 comprises a casing 110 adapted to be mounted at the end of the handlebars MS and a control lever 120, supported by the casing 110 able to rotate with respect to an axis T, transversal with respect to the direction A.

The control lever 120 comprises a substantially cylindrical body 130, coaxial to the axis T, and an arm 140, projecting with respect to the body 130 in the direction of the main axis A, which is substantially tangential to the upper part of the body 130. In use, the arm 140 thus faces forwards in the direction of travel of the bicycle. The body 130 of the control lever 120 is mounted asymmetrically on the casing 110, laterally displaced with respect to the main axis A of the arm 140, in particular towards the right side on the device 100 intended for the left end MS of handlebars.

The arm 140 comprises a first upper pressure area 141, concave and adjacent to the body 130, and a second lower pressure area 142, remote from the body and preferably substantially flat.

The arm 140 also comprises a third lower pressure area 143, concave, between the body 130 and the second pressure area 142.

The arm 140 also comprises a fourth upper pressure area 144, remote from the body 130, preferably slightly concave.

Figure 6:
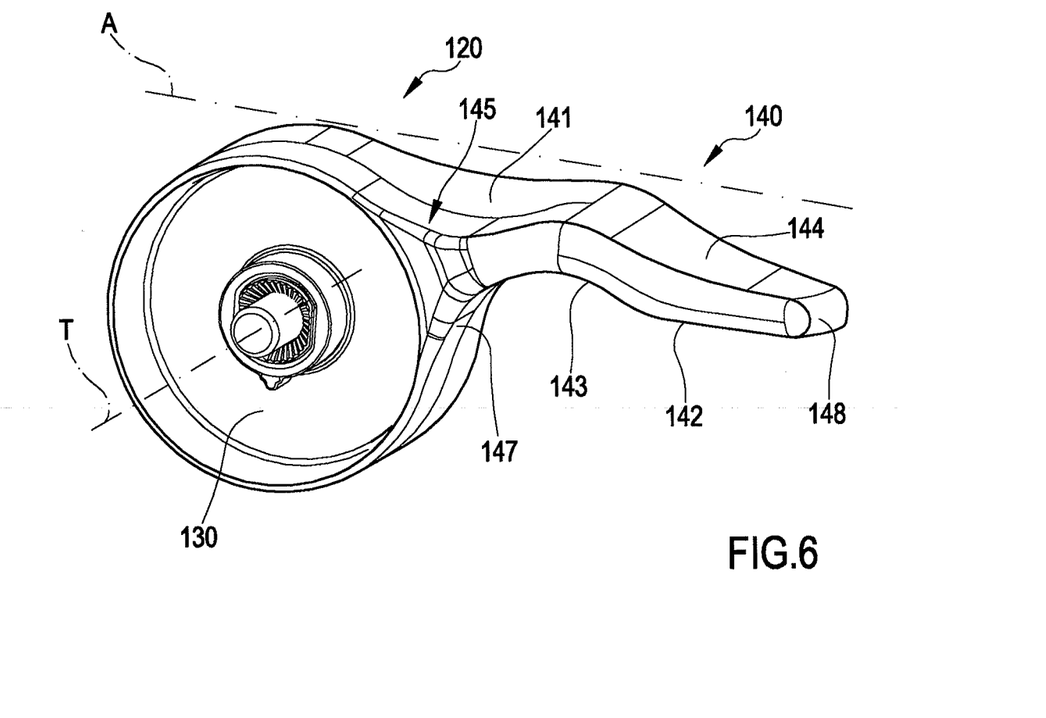
FIG. 6 is a perspective view of just the control lever of the device shown in FIG. 1.
Figure 7:
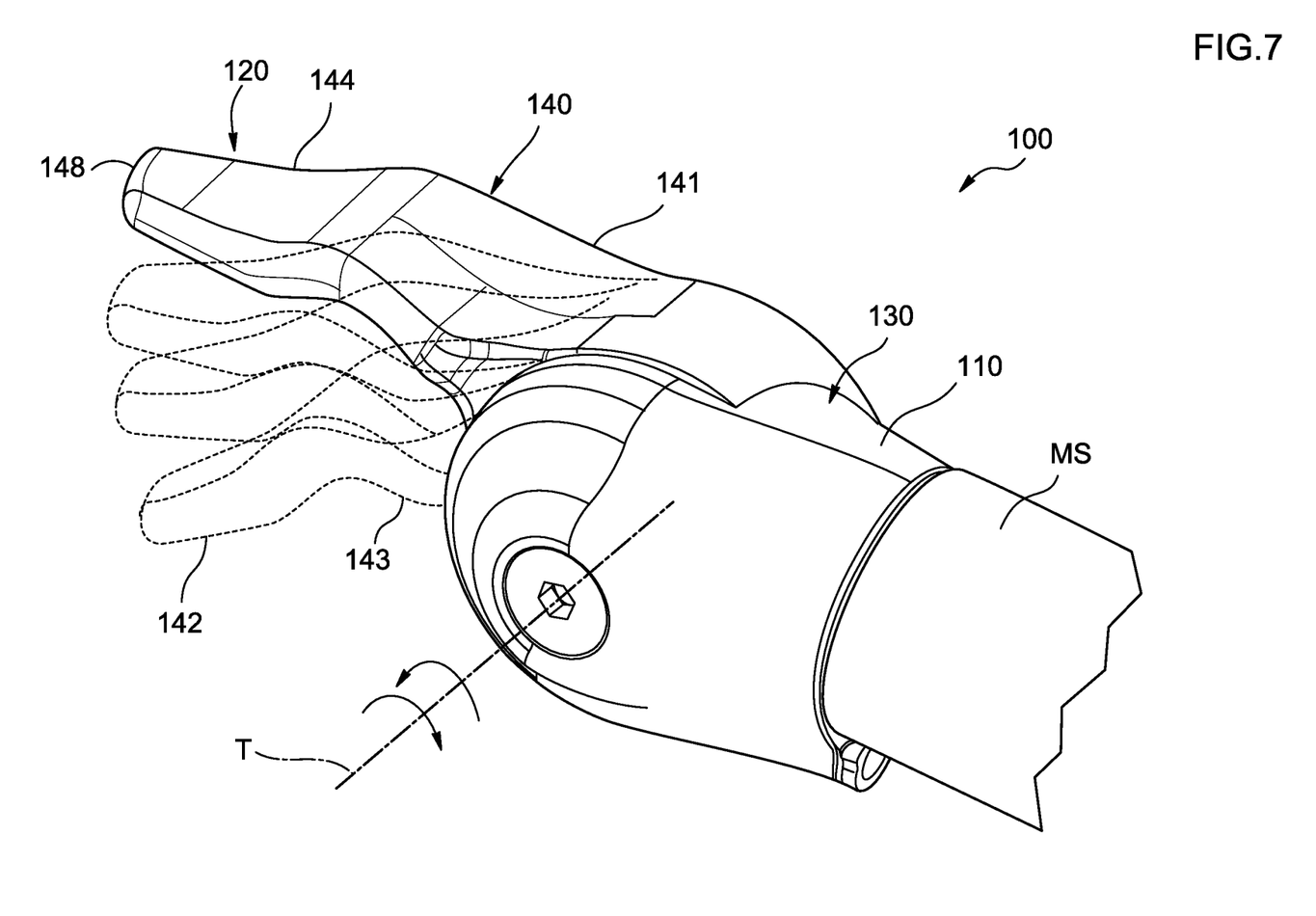
FIG. 7 is a view similar to FIG. 5 that shows the gooseneck of the lever in more detail; and, FIG. 8 is a view similar to FIG. 6 that shows the control lever and body cavity in more detail while the reverse side of the body is essentially flat as shown in FIG. 3.
Figure 8:
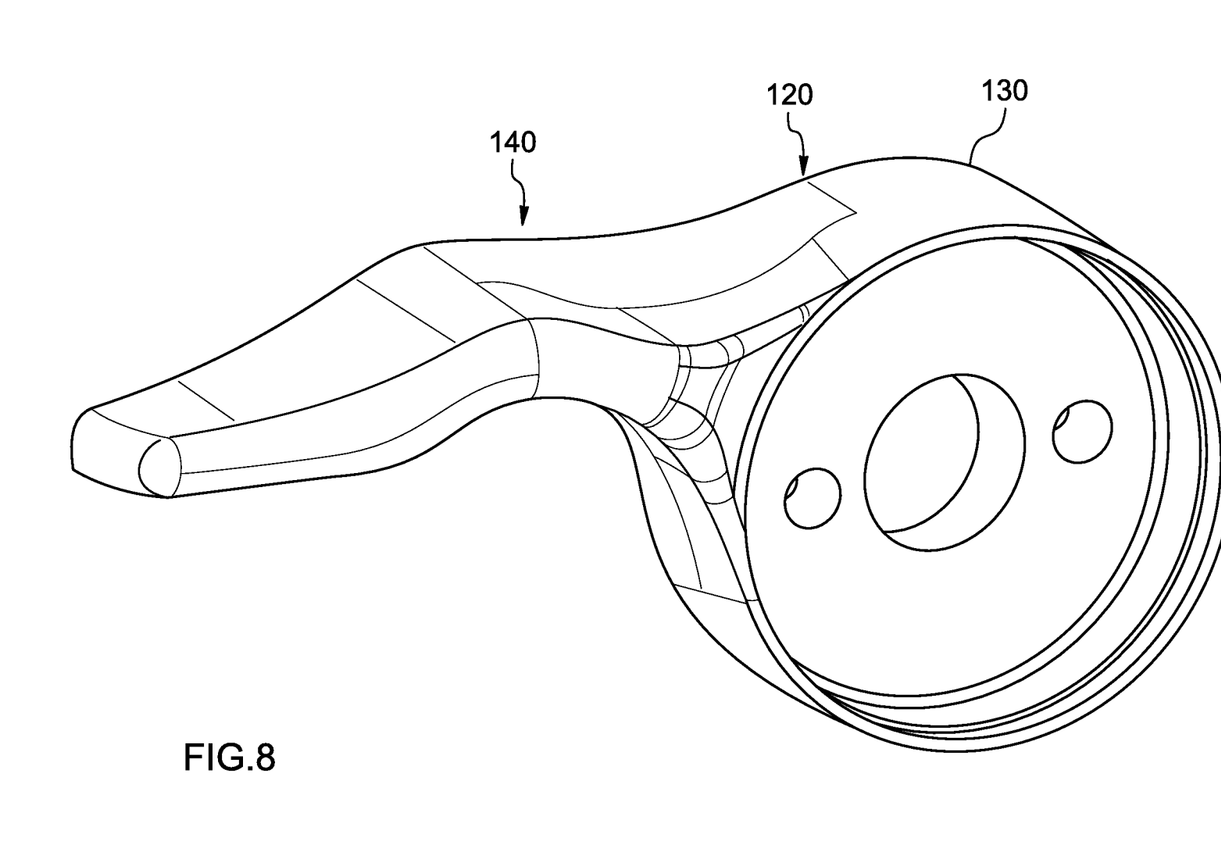

The depth of the concavity of the first pressure area 141 is greater on one side (in particular the left side on the device 100 intended for the left end MS of handlebars), than on the other, with respect to the main axis A of the arm 140. This greater depth is visible particularly in FIG. 6, in an area indicated with 145.

The depth of the concavity of the third pressure area 143 is greater on one side (in particular the left side on the device 100 intended for the left end MS of handlebars), than on the other, with respect to the main axis A of the arm 140. This greater depth is visible particularly in FIG. 6, in an area indicated with 147.

The second pressure area 142 is a greater distance from the main axis A.

The shape in plan of the arm 140 is tapered going away from the body 130 and ends in an end 148 remote from the body 130, inclined both with respect to the main axis A of the arm 140, and with respect to a direction perpendicular to the main axis A, thus parallel to the axis T.

Figure 1:
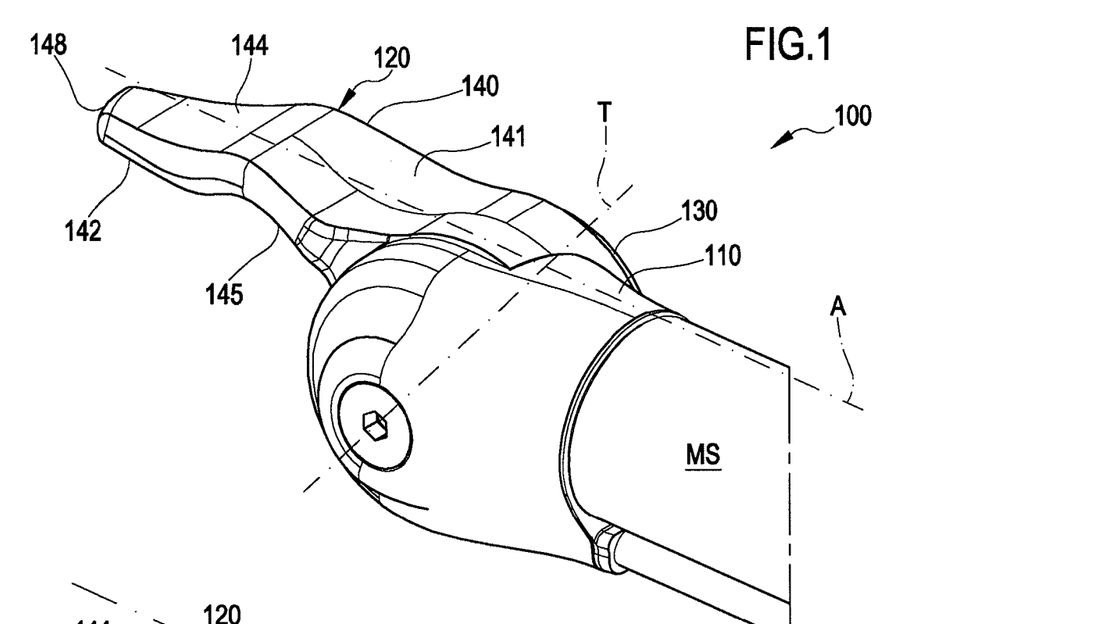
FIG. 1 is a perspective view from above of an end of handlebars with an actuation device and a control lever according to the invention.
Figure 2:
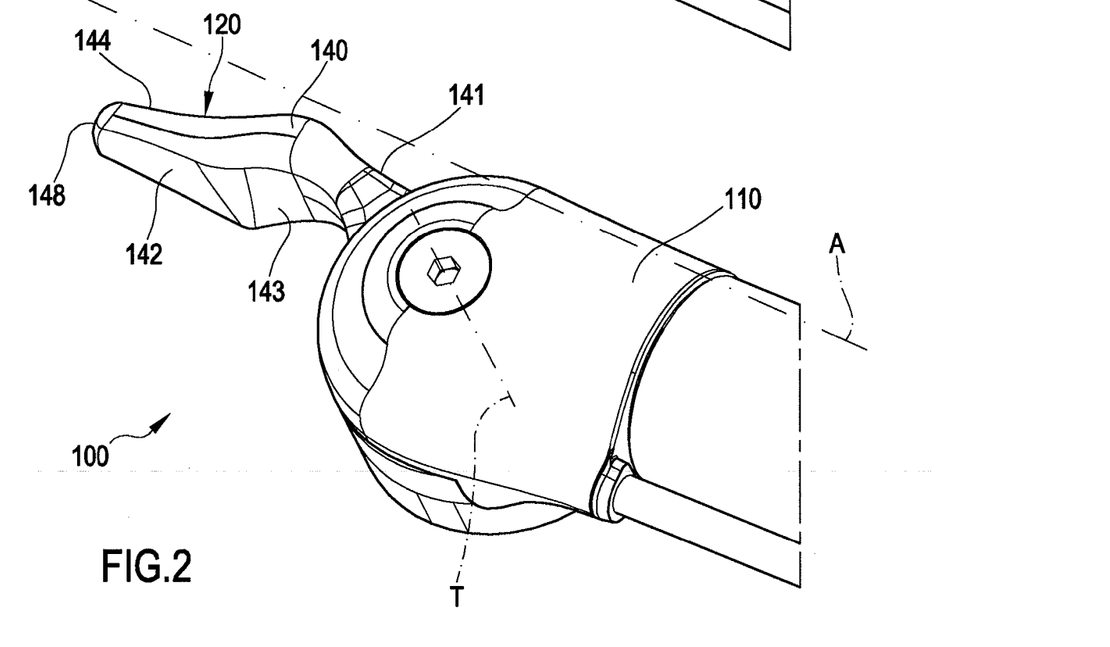
FIG. 2 is a perspective view from below of the end of handlebars of FIG. 1.
Figure 3:
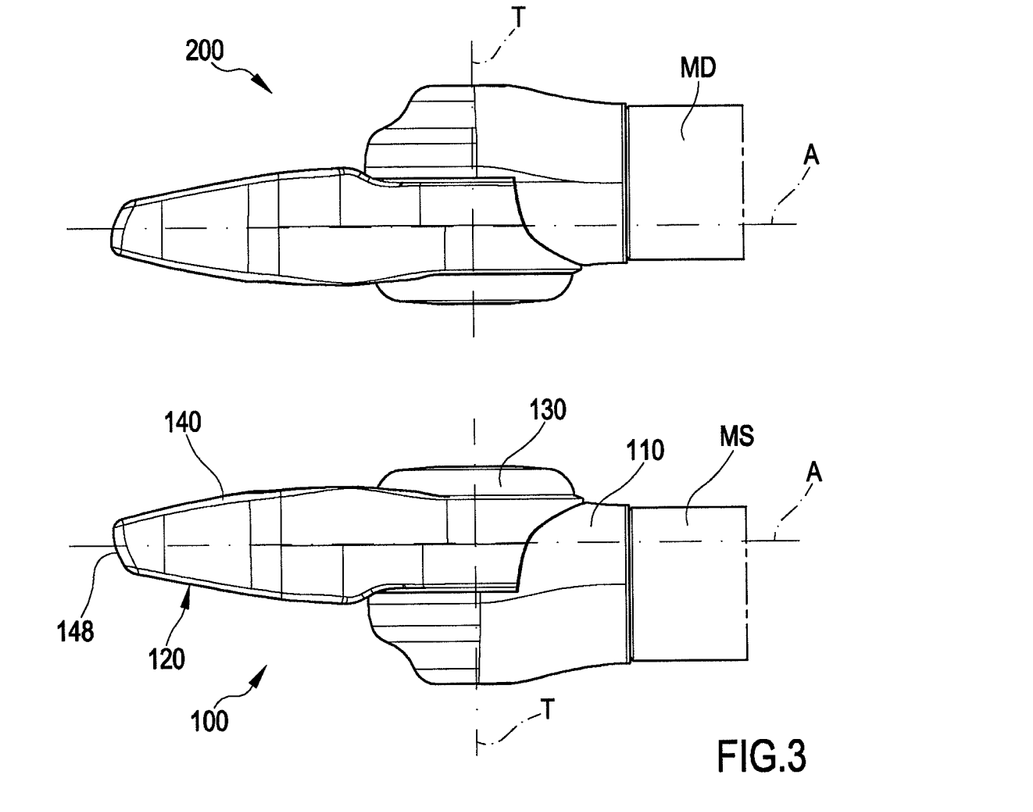
FIG. 3 is a view from above of a pair of ends of handlebars like that of FIG. 1.
Figure 4:
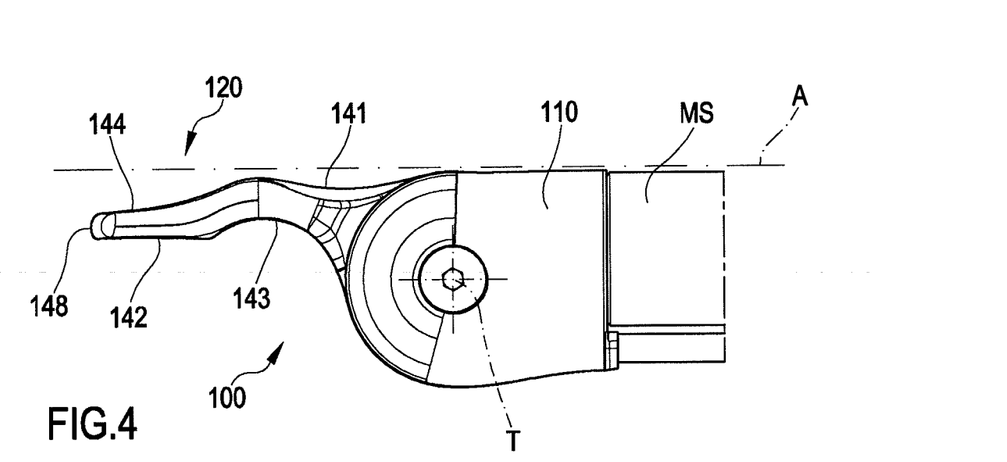
FIG. 4 is a side view of the end of handlebars of FIG. 1.
Figure 5:
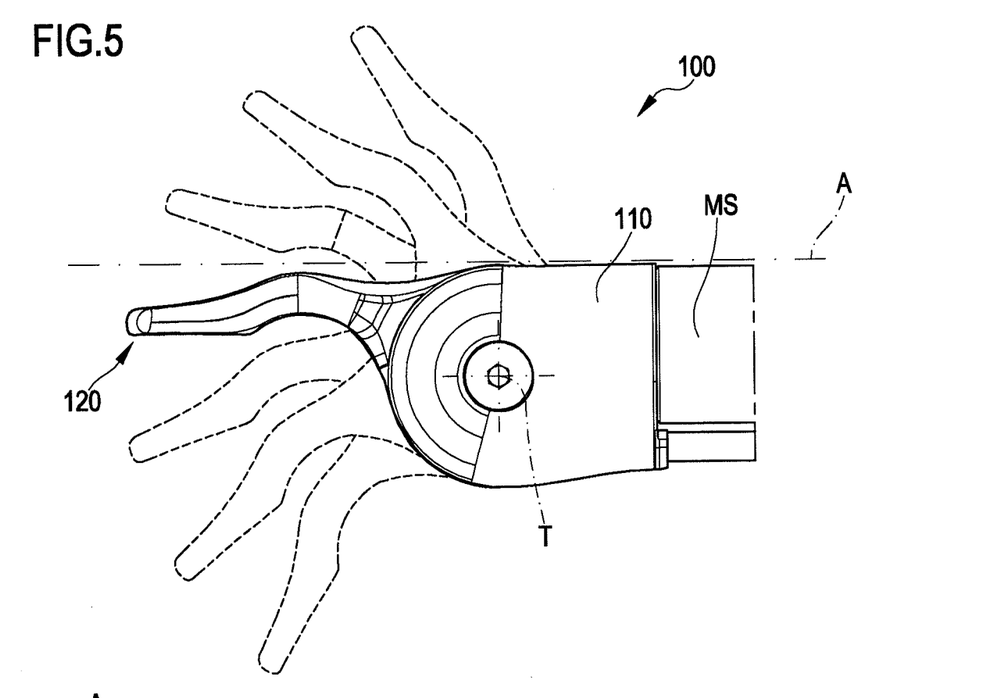
FIG. 5 is a side view the same as FIG. 4, additionally showing the control lever various positions.

FIG. 3 shows both the left and right ends MS, MD of handlebars, seen from above; the left end MS is provided with the device 100, in accordance with the other figures, and the right end MD is provided with a device mirroring it, wholly indicated with 200. It should be understood that the elements of the device 200 mirror those of the device 100, and they will not be described hereafter.

The devices 100, 200 are thus mounted with the respective bodies 130 of the control lever 120 mounted asymmetrically displaced on opposite sides, the right side for the device 100 and the left side for the device 200.

In operation, the cyclist grips the handlebars at the two ends MS and MD, with the hands resting on the casings 110. In a preferred configuration, the cyclist holds his thumb resting on the first pressure area 141, above the arm 140, and the index finger resting with pressure under the arm 140. The thumb is partially housed in the control lever 120 due to the concave shape of the first pressure area 141.

With the fingers in this position, the combination of the hands and the devices 100, 200 takes up an aerodynamically favourable configuration. Moreover, the cyclist can substantially maintain such a position during any gearshifting, because the thumb is already in a position suitable for acting directly and immediately on the control lever 120, whereas the index finger only has to be stretched forward, under the second pressure area 142.

An alternative position for the index finger is offered by the third pressure area 143. When resting in this area, the index finger is bent, partially housed in the control lever 120 thanks to the concave shape of the third pressure area 143. Also in this case, the overall configuration is aerodynamically favourable and the manoeuvring possibilities remain unchanged.

An alternative position for the thumb is offered by the fourth pressure area 144. When resting in this area, the thumb is stretched out, more stretched than when resting on the first pressure area 141, and partially housed in the control lever 120 thanks to the concave shape of the fourth pressure area 144. Also in this case, the overall configuration is aerodynamically favourable and the manoeuvring possibilities remain unchanged.

As can be seen with reference to FIGS. 2, 6, 7 and 8, the preferred configuration, which results in a control lever having a generally gooseneck shaped profile, provides the cyclist alternative positions for the thumb and for the index finger. This is important is important because the cyclist is not forced to maintain the same position, with the attended risk of cramping, and the aerodynamic functionality is not penalized.

The invention claimed is:

1. A control lever, configured for use in an actuation device of a bar-end type bicycle gearshift, wherein the actuation device is adapted to be mounted at one end of a respective one of a pair of handlebars facing forwards in a forward travel direction of a bicycle, the control lever comprising a substantially cylindrical body for mounting in the actuation device and a cantilevered arm, which projects from the body in a direction of a main axis (A), said main axis (A) is defined substantially tangential to an upper part of the body and in an upper quadrant of the body that is defined with reference to a rotation axis (T) of the control lever so the cantilevered arm faces forwards in the direction of travel of the bicycle and is located entirely below the main axis (A) and entirely above the rotation axis (T) in a rest position, the cantilevered arm comprising an upper first pressure area, that is concave and adjacent to a projection point of the cantilevered arm from the body, and a lower second pressure area at a free end portion of the cantilevered arm.

2. The control lever according to claim 1, comprising a lower third pressure area, which is concave, between the body and the lower second pressure area.

3. The control lever of claim 2, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

4. The control lever according to claim 2 wherein the lower second pressure area is placed a greater distance from the main axis (A) than the upper first and lower third pressure areas.

5. The control lever of claim 4, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

6. The control lever according to claim 4, comprising an upper fourth pressure area, remote from the body.

7. The control lever of claim 6, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

8. The control lever according to claim 6 wherein the lower second pressure area is placed a greater distance from the main axis (A) than the first, third or fourth pressure areas.

9. The control lever of claim 8, wherein the lever is provided in each of a pair of the actuation devices having a casing adapted to be mounted at each respective end of the bicycle handlebars facing forwards in the direction of travel of the bicycle and supported so as to be able to rotate with respect to the casing.

10. The control lever according to claim 6, wherein the upper fourth pressure area is concave.

11. The control lever of claim 10, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

12. The control lever according to claim 2, wherein the concavity of the lower third pressure area is deeper on one side than on the other, with respect to the main axis (A) of the arm.

13. The control lever of claim 12 wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

14. The control lever according to claim 1, wherein the lower second pressure area is substantially flat.

15. The control lever according to claim 1 wherein the lower second pressure area is placed a greater distance from the main axis (A) than the first or third pressure areas.

16. The control lever of claim 15, wherein the lever is provided in each of a pair of the actuation devices having a casing adapted to be mounted at each respective end the bicycle handlebars facing forwards in the direction of travel of the bicycle and supported so as to be able to rotate with respect to the casing about the axis (T).

17. The control lever according to claim 1, wherein the concavity of the upper first pressure area is deeper on one side than on the other, with respect to the main axis (A) of the arm.

18. The control lever of claim 17, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

19. The control lever of claim 1, wherein the lever is provided in each of a pair of the actuation devices having a casing adapted to be mounted at each respective end of the bicycle handlebars facing forwards in the direction of travel of the bicycle and supported so as to be able to rotate with respect to the casing about the axis (T).

20. The control lever according to claim 1, wherein the shape of the arm, in a plan view, is tapered going away from the body about the axis (T).

21. The control lever according to claim 1, wherein the arm has an end remote from the body inclined, both with respect to the main axis (A) of the arm, and with respect to a direction perpendicular to the main axis (A).

22. The control lever according to claim 1, further comprising a casing upon which the body of the control lever is mounted asymmetrically and laterally displaced with respect to the main axis (A) of the arm.

23. The control lever of claim 1, wherein the lever is provided in each of a pair of the actuation devices having a casing adapted to be mounted at each respective end of the bicycle handlebars facing forwards in the direction of travel of the bicycle and each of the actuation devices is mounted asymmetrically at its respective end.

24. The control lever according to claim 23 further comprising a lower third pressure area, which is concave, between the body and the lower second pressure area.

25. The control lever according to claim 24 wherein the concavity of the lower third pressure area is deeper on one side than on the other, with respect to the main axis (A) of the arm.

26. A control lever for an actuation device of a bicycle end-bar gearshift that is mountable at either end of a set of handlebars with the control lever facing a bicycle's forward travel direction, the control lever comprising:
a substantially cylindrical body that has a main axis (A) defined substantially tangential to an upper part of the body and extending in the forward direction of travel and is configured for mounting in the actuation device and a cantilevered arm, which projects from the body in the forward direction of the travel and projects from the body in a direction of the main axis (A), and is located entirely below the main axis (A) and entirely above a rotation axis (T) of the control lever in a rest position; the arm including an upper first pressure area that is concave and adjacent to a connection point of the cantilevered arm to the body, and a lower second pressure area at a free end portion of the cantilevered arm.

* * * * *

UNITED STATES PATENT AND TRADEMARK OFFICE
CERTIFICATE OF CORRECTION

PATENT NO.        : 9,327,794 B2
APPLICATION NO.   : 13/310383
DATED             : May 3, 2016
INVENTOR(S)       : Massimo Dal Pozzo and Giuseppe Dal Prà

It is certified that error appears in the above-identified patent and that said Letters Patent is hereby corrected as shown below:

On the Title Page, item (73), under "Assignee", in Column 1, Line 1, delete "Compagnolo" and insert -- Campagnolo --, therefor.

Signed and Sealed this
Twelfth Day of July, 2016

Michelle K. Lee
*Director of the United States Patent and Trademark Office*